F. J. MANN.
AGRICULTURAL MACHINE.
APPLICATION FILED APR. 21, 1921.
1,403,801.
Patented Jan. 17, 1922.
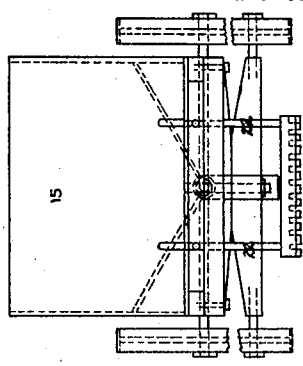
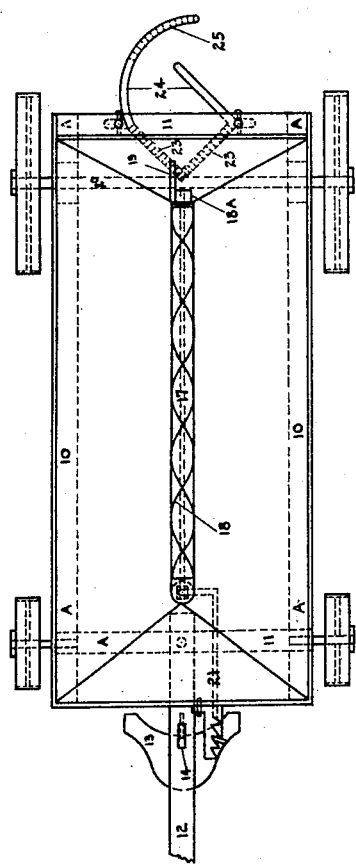
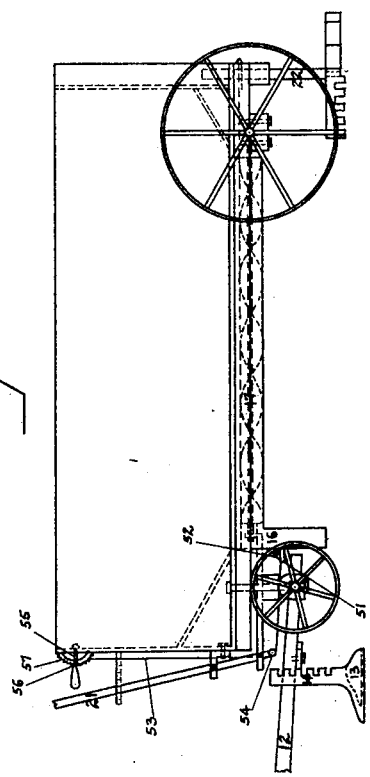
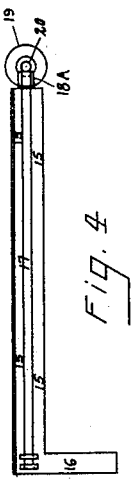
FRANCIS JOY MANN *INVENTOR.*
BY *Richey Slough & Tales*
*His* ATTORNEYS

UNITED STATES PATENT OFFICE.

FRANK J. MANN, OF COLUMBIA STATION, OHIO.

AGRICULTURAL MACHINE.

1,403,801.　　　Specification of Letters Patent.　　Patented Jan. 17, 1922.

Application filed April 21, 1921. Serial No. 463,167.

*To all whom it may concern:*

Be it known that I, FRANK J. MANN, a citizen of the United States, residing at Columbia Station, in the county of Lorain and State of Ohio, have invented certain new and useful Improvements in Agricultural Machines; and I do hereby declare the following to be a full, clear, concise, and exact description of the invention, such as will enable those skilled in the art to which it appertains to make and use the same.

My invention relates to agricultural machines, and more particularly to such agricultural machines as are designed to provide a furrow in the ground and distribute manure, or other like fertilizer, in the furrow, and to subsequently cover the same with dirt, which is raked and scraped to insure the raising of a good crop, inasmuch as such a fertilizer as manure will, when so placed, prevent the sun's heat from penetrating to the roots of planted crops, with detrimental effect.

It is an object of my invention to accomplish the foregoing in a mechanism which is simple and inexpensive to construct, and which will produce uniformly efficient results with a minimum expenditure of labor, and which will contain few and positively operating parts which will stand rough usage and permit any correct adjustments.

Other objects and advantages of the invention will be better understood when the following detailed description is read in connection with the accompanying drawings, the invention residing in the combination, construction and arrangement of parts as claimed.

In the drawings forming part of this application, like numerals of reference indicate similar parts in the several views, and wherein:

Fig. 1 is a top plan view of the machine constructed in accordance with the invention.

Fig. 2 is a side elevation.

Fig. 3 is a rear elevation.

Fig. 4 is a view of the power transmission system.

Referring to the drawings in detail, A indicates generally a wheeled frame which includes the spaced parallel members 10 connected by means of the cross members 11. A plow beam 12 projects forwardly from the frame and supports the plow 13, the shank 14 of the latter being associated with the beam 12 for vertical adjustment in any well known manner.

Supported by the parallel members 10 of the frame is a hopper 15 which is adapted to contain the manure or other fertilizer from the hopper into the furrow formed by the plow 13. A shaft 17 passes longitudinally through the hopper 15 and is formed to provide a worm screw 18 at a suitable point in its length, the worm screw operating within the hopper 15 to mutilate the manure, as well as to feed the latter from the hopper to the chute 16. The shaft 17 supports a gear 18 at one end thereof, which is adapted to mesh with the spaced gears 19 fixed upon the rear axle 20, so that the shaft 17 is driven from the rear axle when the machine is in motion. The shaft 17 is slidably mounted upon the frame and includes a lever 21, by means of which the shaft 17 may be shifted to bring the gear 18 into proper association with the gears 19, for the purpose specified.

Depending from the rear of the machine are bracket arms 22 which support the combined rake and scraper, as shown in the assembly views of the same. This device is substantially diamond-shaped, with the sides 23 formed to provide a rake, while the sides 24 are formed to provide scrapers. One of the sides 24 is extended to provide a rake 25, which is disposed to follow the scrapers 24, as shown.

In operation, when the machine is moved over the ground or surface, the plow 13 provides the furrow above mentioned, while the worm screw 18 of the shaft 17 mutilates the fertilizer, such as manure, in the hopper 15, and feeds the fertilizer to the chute 16. The latter conveys the manure or like fertilizer from the hopper 15 into the furrow, after which the rakes 23 pass over the furrow and throw to each side of the latter all large and lumpy pieces of dirt, thereby leaving only the fine dirt which is being scraped up by the scrapers 24 and carried to the center of the furrow covering the latter and the fertilizer. The rake 25 is arranged to follow the scrapers 24 so that whatever lumpy dirt remains is removed from over the center of the furrow, thereby leaving the ground in a condition to insure the raising of a good crop. The combined rake and scraper is adjustably mounted upon the bracket arms 22. The manure will prevent the heat of the sun from penetrating the roots of the plants, in event of an unusually dry summer, but if the summer is wet, the manure will prevent the dirt from packing around the roots in a manner which frequently prevents the growing of the latter.

In the chute 16 I position an adjustable, sliding valve member 51, which is for the purpose of varying the amount of the fertilizer which may flow through the chute 16. In the embodiment shown, this valve member is normally kept in full valve closing position by the action of the spring 52, but the valve may be opened by the cable 53, which is attached to an end of the valve member 51, and which passes over a roller 54 and is attached at its other end to a lever 55, said lever being adapted to be secured in any desired valve-operating adjusted position by means of the detent 56 secured thereto fitting into a notch of the quadrant member 57.

When the cable 53 is pulled by the motion of the lever 55, the valve member 51 is pulled toward valve opening position a predetermined amount, as determined by the motion of the lever against the power of the spring 52, and which spring is effective to restore the valve to closed position when the lever is released to restore. In this way I may limit, according to the needs of the ground and other conditions, the manure or other fertilizer delivered to the chute 16 by the conveying and breaking up mechanism.

Having described my invention in a specific embodiment, I am aware that numerous and extensive departures may be made therefrom, but without departing from the spirit of my invention, and I, therefore, desire it to be understood that I do not limit myself to the specific mechanism herein shown and described, but that such changes may be resorted to when desired as fall within the scope of the appended claims.

What I claim is:

1. In a machine of the kind described having a wheeled support, a hopper, a chute depending from the hopper, and a plow carried by the support in advance of the chute: a coverer comprising a rake in rear of the chute extending outward and rearward, a scraper in rear of the rake, and a second rake in rear of the scraper extending inward and rearward.

2. In a machine of the kind described having a wheeled support, a hopper, a chute depending from the hopper, and a plow carried by the support in advance of the chute: a coverer comprising a pair of rakes diverging rearwardly from one another to opposite sides of the furrow turned by the plow and situated in rear of the chute, a scraper in rear of said rakes and extending obliquely, and a rake in rear of the scraper and extending obliquely.

In witness whereof, I have hereunto signed my name this 18th day of April, 1921.

FRANK J. MANN